(12) United States Patent
Esteve Asensio et al.

(10) Patent No.: US 8,209,436 B2
(45) Date of Patent: Jun. 26, 2012

(54) METHOD AND SYSTEM OF MIGRATING PROFILES IN TELECOMMUNICATIONS DEVICES

(75) Inventors: Guillermo Esteve Asensio, Madrid (ES); Lucia Garate Mutiloa, Madrid (ES); Javier Gonzalo Gracia, Madrid (ES); Angel Machin Garcia, Madrid (ES); Guillermo Caudevilla Laliena, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 77 days.

(21) Appl. No.: 12/767,131

(22) Filed: Apr. 26, 2010

(65) Prior Publication Data

US 2010/0325313 A1 Dec. 23, 2010

(30) Foreign Application Priority Data

Apr. 24, 2009 (ES) .................................. 200901083

(51) Int. Cl.
*G06F 15/16* (2006.01)
*G06F 12/00* (2006.01)
(52) U.S. Cl. ...................................... 709/246; 709/250
(58) Field of Classification Search .................. 709/246, 709/248, 250, 203
See application file for complete search history.

(56) References Cited

U.S. PATENT DOCUMENTS

| | | | |
|---|---|---|---|
| 7,171,199 B1* | 1/2007 | Rahman | 455/433 |
| 7,412,446 B2* | 8/2008 | Shah | 1/1 |
| 2004/0098419 A1 | 5/2004 | Bantz et al. | |
| 2004/0117322 A1* | 6/2004 | Bjorksten et al. | 705/80 |
| 2006/0026587 A1 | 2/2006 | Lemarroy et al. | |
| 2006/0059260 A1* | 3/2006 | Kelly et al. | 709/225 |
| 2006/0120518 A1 | 6/2006 | Baudino et al. | |
| 2007/0106672 A1* | 5/2007 | Sighart et al. | 707/10 |
| 2007/0250617 A1* | 10/2007 | Kim et al. | 709/223 |
| 2008/0016231 A1* | 1/2008 | Itabashi et al. | 709/229 |
| 2008/0215758 A1* | 9/2008 | Gerdes et al. | 709/248 |
| 2008/0244060 A1* | 10/2008 | Cripe et al. | 709/224 |
| 2009/0302998 A1* | 12/2009 | Trappeniers et al. | 340/5.61 |

FOREIGN PATENT DOCUMENTS

WO WO-2008/109291 9/2008

* cited by examiner

*Primary Examiner* — Zarnin Maung
(74) *Attorney, Agent, or Firm* — B. Aaron Schulman, Esq.; Nicholas B. Trenkle, Esq.; Stites & Harbison, PLLC

(57) ABSTRACT

A method of migrating a user profile from a first device to a second device. Firstly, a request is made (1a, 1b, 1c) for migrating a user profile (102) located in the first device (100) to the second device (120). Next, the information forming said user profile (102) and an access policy (103) to said user profile is retrieved (2, 3). The request and the retrieval steps are mediated by a profile manager (104). This profile manager (104) then sends, to a server (150), said information forming said user profile (102) and said access policy (103). The server (150) stores (5) said information forming the user profile (102) in a first database (154) and said access policy (103) in a second database (153), the server (150) comprising a profile manager database (155) wherein a plurality of profile managers are stored. One of the stored profile managers is a copy of said profile manager (104) located within said first device (100). A further request (10a, 10b, 10c) is made for sending from said server (150) to the second device (120) said user profile (102), said user policy (103) and said profile manager (104) located in said respective databases (154, 153, 155). The server (150) then sends (13a, 13b, 13c, 14a, 14b, 14c), to said second device (120), at least a reduced version of said profile manager which is compatible with the second device (120).

13 Claims, 4 Drawing Sheets

METHOD AND SYSTEM OF MIGRATING PROFILES IN TELECOMMUNICATIONS DEVICES

FIELD OF THE INVENTION

The present invention relates to methods and systems for managing user profiles in telecommunications networks and devices and, in particular, in mobile communications networks and devices.

STATE OF THE ART

In telecommunications networks, it is desirable to be able to determine a user's habits, likes and any other additional information, such as his/her socio-demographic characteristics, in order to provide some user services, such as an advertising service or a personalization service. With this user information, a set of information or profile can be generated. The generation and update of a profile can be implemented by any combination of methods (such as direct questions or forms, data extraction from usage of products and services, etc.).

A profile provides a degree of continuity of delivery to potential service providers in respect of the user's behaviour and preferences in relation to possible user services. This does not mean that a user profile does not change in time—it can be updated with new information at any time—, so it is possible to make reasonable predictions on how those services could be more efficiently provided, based on the profile.

As already mentioned, a profile can be defined as a set of data related to a person, which can be used in one or more applications. Non-limiting examples of data which can form a profile are: the layout of elements at the Windows desktop or on the screen of a mobile telephone (menu icons), how a user wants the devices he/she uses to behave or react (PC, laptop, television . . . ) when an incoming connection (email, call, SMS . . . ) is received from a certain person, etc.

Around the profile itself (defined above as a set of data or information) there is normally a profile manager, which is a logical entity, program module, set of rules or the like, which controls the access (for reading or writing data) of an application (e.g. navigator, text editor, mobile phone agenda . . . ) to the user profile for improving the user service or for facilitating the reconfiguration of other applications. For example, an email application can use the user profile for configuring itself (e.g. a bell sounds when a new email arrives at the inbox) without requiring a search in unknown menus. An application can also change the user profile. One profile manager can control one or more user profiles.

Therefore, the profile manager provides a profile service to the user services, consisting of all the functions and interfaces for using, controlling, managing and/or modifying a profile.

However, the continuity of the profile service can be lost for many reasons, for instance due to a device replacement, data corruption, lack of standardization between profile formats or a change in the operating system of the device.

One of the worst scenarios of discontinuity of the profile service occurs when the user changes device and there are substantial differences between the old operating environments and the new ones, for example when both devices have different operating systems and capabilities. It is to be remarked that semantically, the profile itself does not change. However, when transferring a profile from a first device to a second device, the coding of its data does change. For example, if the first and second devices are a first and second mobile phones, the provider of the first mobile phone may fix the coordinate 0,0 of the screen at the left top corner and the provider of the second mobile phone may fix the same coordinate 0,0 at the left bottom corner. Thus, a manager which adapts preferences from a semantic level to an application level in different environments is required. In other words, the profile may be composed of data such as "favourite colour: blue", but this is stored as "favourite colour: 3452". This "3452" will be converted into "blue" or into a different colour according to the interpretation of the application which uses the profile. To add complexity, it is possible to have several profile services in a single device, either for the same user or for several ones.

The profile(s) can be stored either locally, in the device, such as portable or mobile device, or remotely, in a network server, or distributed between a local device and one or more network servers. The profile managers can be provided either locally to the profiles or locally to the user services. Besides, it can happen that the profile manager required to handle a certain profile cannot work in a different operating environment. This means that, in this case, the discontinuity also affects the profile manager: The profile service provided by the profile manager could be lost if there is no connection with the remote profile manager.

Currently the only known solutions to the above mentioned discontinuity problem are:
  Firstly, no solution at all, since in many situations the profile is lost when the discontinuity is too pronounced. This happens frequently with the user profiles generated by some web pages using cookies. In this case, the problem is not addressed at all.
  Secondly, to copy the profile to a place or repository that is as safe from as many service discontinuities as possible. When continuity is lost, the user or an application can present user identification information to this repository and request access to the corresponding profile. Examples of this are: to store profiles in SIM cards, USB sticks or memory cards. This procedure requires a single method to manage profiles from several profile managers, which is a costly standardization effort.
  Thirdly, it is possible to have a profile manager in the network and to access that profile manager from a user application on the device. This happens, for instance, in several PC applications, but has the major disadvantage of losing the service when the connectivity is lost.
  Finally, to define a universal profile manager that works in any operating environment, for instance using a Java implementation or a standard. This solution may also copy the profile into the network in order to be able to recover it in the event of loss of data. However, this solution depends on the industry adoption of a common set of "universal" operating conditions, which to date has not happened.

Therefore, there is a need to provide a solution to the above mentioned discontinuity problem. In particular, there is a need to maintain the profile service in such circumstances, however continuity may have been lost, whether it be by a device replacement, by data corruption or by a change in the operative system of the device.

SUMMARY OF THE INVENTION

The present invention is intended to address the above mentioned need by allowing the transfer of profiles between any devices, including very different ones, thus avoiding discontinuities that degrade the profile service.

In a first aspect of the present invention there is provided a method of migrating a user profile from a first device to a second device. The method comprises the steps of: making a request for migrating a user profile located in a first device to a second device, said request being made to a profile manager located within said first device; retrieving by said profile manager the information forming said user profile and an access policy to said user profile; sending, from said profile manager to a server, said information forming said user profile and said access policy, said server storing said information forming the user profile in a first database and said access policy in a second database, said server comprising a profile manager database wherein a plurality of profile managers are stored, including a copy of said profile manager located within said first device; making a request for sending from said server to a second device said user profile, said user policy and said profile manager located in said respective databases; sending from said server to said second device, at least a reduced version of said profile manager which is compatible with said second device.

Preferably, said step of sending said information forming said user profile and said access policy and storing them in a respective database, comprises the steps of: sending a migration request message from a communications module of said profile manager to a communications module of a profile migration module located in said server; storing said information forming the user profile and said access policy in respective databases; assigning an identifier identifying said profile migration request; sending said identifier to the profile manager of said first device. Said request for sending from said server to a second device said user profile, said user policy and said profile manager, preferably comprises said identifier assigned to the migration request and information of the type of device from which said request is made.

The identifier assigned to the migration request and the information of the type of device from which said request is made are obtained by interrogating the entity of said second device initiating said request by means of the profile migration module in said server. Preferably, said entity of said device initiating said request is selected from a group including: a graphical user interface through which a user is capable of accessing said second device; an application resident in said second device; or an application resident in a card located within said second device. That card in which said application is resident is preferably a smartcard such as a SIM card.

The method further comprises the steps of: receiving at the profile migration module located in said server said request comprising said identifier associated to the profile migration request and said information of the type of device from which said request is made; sending, from said profile migration module to a profile manager selector located in said server, said identifier and said information of the type of device; at said profile manager selector, identifying an implementation of the requested profile manager which is compatible with said type of device and sending a reference code of said profile manager to said profile migration module; obtaining from said profile manager database said identified implementation of the requested profile manager which is compatible with said type of device.

Preferably, the step of sending from said server to said second device, at least a reduced version of said profile manager which is compatible with said second device comprises sending from said server to said second device, said requested user profile, user policy and profile manager.

That step of making a request for migrating a user profile is preferably made by: a user accessing said first device through a graphical user interface or by an application resident in said first device or by an application resident in a card located within said first device. The card is preferably a SIM card.

In a further aspect of the present invention there is provided a system comprising a first device, a second device and a server, said system being configured for carrying out the previously detailed method. Preferably, at least one of said first device or second device is a mobile communications device.

Finally, the invention also refers to a computer program comprising computer program code means adapted to perform the steps of the above-mentioned method when said program is run on a computer, a digital signal processor, a field-programmable gate array, an application-specific integrated circuit, a micro-processor, a micro-controller, or any other form of programmable hardware.

The advantages of the proposed invention will become apparent in the description that follows.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but rather as an example of how the invention can be embodied. The drawings comprise the following figures.

Figure 1:
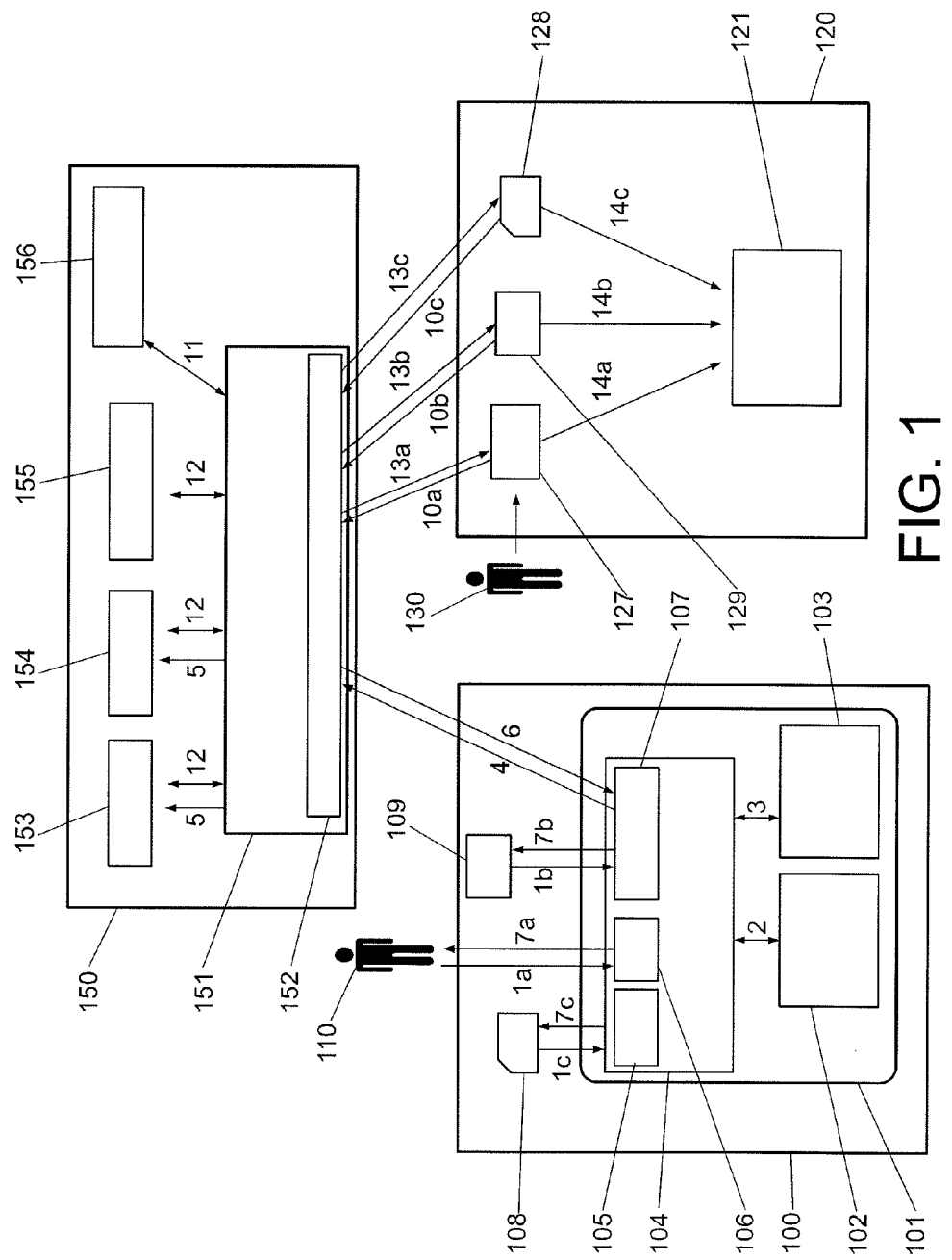
FIG. 1 shows a schematic representation of a system for implementing the method according to an embodiment of the present invention.

DESCRIPTION OF PREFERRED
EMBODIMENTS OF THE INVENTION

In the context of the present invention:

A "profile" can be defined as a set of data related to a person or user, which can be used in one or more applications. A piece of information which forms part of a profile can be transferred from a first device to a second device or from a certain format to a different format. The interpretation of the transferred piece of information is carried out by a profile manager. The access to that piece of information, adapted to the needs of a user service, is a profile service.

A "profile manager" is a program or set of rules which transforms the preferences and other personal data into specific aspects of a device or application. This transformation is called "profile service".

In other words, a "profile service" denotes the access to and transformation of the information or data of a profile adapted to the requirements of a user service. This term can be also defined as a semantic interpretation of the profile with the purpose of making this meaning available to user applications and programs.

The term "service" refers to a set of functions and interfaces. Non-limiting examples of functions are: reading a piece of data, modifying a piece of data and writing a piece of data which did not exist in the profile. For performing such functions, an interface is used, which consists in a list of specific commands with a common syntax.

As a matter of example, if a user service is an email program in a device and a SMS-receiving program in another device, both user services will react in a similar way (e.g.

ringing a bell when a message is received), although the user does not need to search in the configuration of each program or user service in order to configure said ringing of a bell.

Another example is described next: the piece of data "When a new message arrives, I would like to be informed by a bell and by a note on the screen" is part of a profile and can be transferred from a first device to a second device. The interpretation of that piece of data is given by the profile manager, which is a program in charge of transforming the preferences and other personal data into specific aspects of the device or application. This transformation is called profile service. If the "user service" is an email program in a device and a SMS-receiving program in another device, both user services will react in a similar way (e.g. ringing a bell when a message is received), although the user does not need to search in the configuration of each program or user service in order to configure said ringing of a bell.

The term "operating environment" refers to the elements defining the scenario in each device where the functions of the device are performed, as for instance the function of music reproduction in a portable music device. These elements refer to the following non-exhaustive list of information: type of device, operating system, connectivity capabilities, applications able of using profile services, etc.

In this text, the term "comprises" and its derivations (such as "comprising", etc.) should not be understood in an excluding sense, that is, these terms should not be interpreted as excluding the possibility that what is described and defined may include further elements, steps, etc.

The implementation of a first exemplary embodiment of the present invention, which refers to a situation in which a second device 120, to which the profile service 101 of a first device 100 needs to be exported, counts with the required resources for installing the whole system (the whole profile service), can be carried out as follows:

FIG. 1 shows a schematic representation of a system which supports the inventive method of guaranteeing the continuity or migration of profiles and profile services. The system comprises a first device 100 and a second device 120. The first device 100 is going to share or pass a profile 102 to the second device 120. The system also comprises a server 150, which is a continuity server or a migration server because it is responsible for providing continuity between profile services. Non-limiting examples of the first device 100 and the second one 120 are: phones, portable computers, video or audio reproducers, electronic book readers, game consoles, TV or multimedia sets, displays in cars or appliances, automatic transfer machines (ATMs), keyboards, electronic doors, alarms or security mechanisms, home automation (domotic) equipment, etc. Preferably, the devices 100 120 are mobile communications devices.

The first device 100 comprises a profile service 101, which is in turn formed by at least one profile 102 (which is a set of information), an access policy (which is a set of rules for accessing the profile 102) and a profile manager 104. The device 100 may also comprise a card, preferably a Subscriber Identity Module (SIM) card or the like 108 and at least one application 109. Besides, the profile manager 104 comprises several entities, such as a card communication module 105 (preferably a SIM card communication module 105, if the card 108 is a SIM card) a graphical user interface 106 and a communications module 107. The card or SIM card communication module 105 is configured to communicate through an input/output interface with the card 108, the graphical user interface 106 is configured to communicate with a certain user 110 of the device 100 and the communications module 107 is configured to communicate with another communications module, as will be explained later. The profile manager 104 also comprises the required interfaces for communicating with the at least one profile 102 and the access policy 103. The pieces of data which form the profile 102 can be either local or remote or a combination of both.

The second device 120 comprises a profile service 121, which is in turn formed by at least one profile, an access policy and a profile manager. These three entities have not been detailed in FIG. 1 for simplicity reasons. The device 120 may also comprise a card, such as a SIM card or the like 128, at least one application 129 and a browser 127, through which a user 130 can access the device 120. The user 110 of the first device 100 can be either the same or a different one as the user 130 of the second device 120. Like in device 100, the profile service 121 (and in particular, its profile manager) is capable of communicating with the card 128, with the at least one application 129 and with the browser 127 through respective interfaces. Besides, the card 128, the at least one application 129 and the browser 127 are configured to communicate with an external communications module, as will be explained later. The card 128 is preferably a Subscriber Identity Module card or SIM card or the like 208.

The continuity server or migration server 150 comprises a profile continuity module or profile migration module 151, which in turn comprises a communications module 152. Besides, the server 150 comprises several databases, such as an access policy database 153, a profiles database 154 and a profile manager database 155. These databases communicate with the profile continuity module or profile migration module 151 through respective interfaces. The server 150 also comprises a profile manager selector 156, which is also configured to communicate with the profile migration module 151 through an interface.

The purpose of the profile continuity module or profile migration module 151 is to maintain communication with the profile managers in both devices 100 120 while identifying the same customer across them. This identification can be made by any means, as a unique reference or identifier in the profile or by any other means. Therefore the profile migration module 151 uses the other elements of the server 150 to manage the procedure of migrating a profile. This is done by acquiring an understanding of the source and destination of the profile, user and involved devices, in order to select the appropriate actions, such as which profile manager 104 is the most appropriate to each device and how the data of the profile 102 should be provided to each profile manager having in consideration the operating environment at each device.

The purpose of the profile manager selector 156 is to choose the appropriate profile manager form a profile manager database 155 based on the above referred identifier and the set of information gathered by the profile managers about the operating environment, such as type of device, operative system, connectivity capabilities, etc. This information is used to select a profile manager able to operate in the operating environment of each device and to provide the most appropriate profile service 101 to the user applications present in each device. The profile manager database 155 therefore stores a plurality of profile managers, including the one located in the first device 100.

The communication between the first device 100 and the server 150 and between the second device 120 and the server 150 can be carried out through any available interface, either fixed line or wireless. Non-limiting examples of such interfaces are: XML, SOAP, SSL, GSM/UMTS/LTE, WiFi/WiMAX, ADSL, Bluetooth, TCP/IP, Frame Relay, Ethernet, etc.

Next, the method of migrating profiles and profile services or guaranteeing the continuity of profiles and profile services is explained in detail in relation to FIG. 1. The method is applicable, for example, when a user wants to replace his/her device, such as a mobile communications device, but he/she is obviously interested in keeping his/her profile, preferences, etc.

The method can be divided into two main blocks: a first block for providing the migration server or continuity server 150 with the user profile 102 and the access policy 103 (in general, with the profile service 101) of the first device 100; and a second block for retrieving, from the server 150, the profile manager, profiles and access policy (that is to say, the profile service), by the second device 120.

The first block for providing the server 150 with the user profile 102 and the access policy 103 of the first device 100 is described next:

First, a request for keeping or maintaining the continuity of a user profile 102 is made to the profile manager 104 of the device 100. This request can also be seen as a request of migration of the user profile 102 from the device 100 which currently keeps the profile 101 to a different device 120. This request is normally done before or at the moment of detecting an event or situation that affects or may affect the continuity of the profile service. That event or situation can be detected either by a specific procedure, by the profile manager or by the user or the user service(s). This request is preferably made from one of these situations/entities:

- a user 110 requests, through the graphical user interface 106, the activation of the continuity of his/her profile 102 (referred to in FIG. 1 as 1*a*);
- an application 109 having certain privileges (which are out of the scope of the present invention) and being resident in the device 100, requests, through the communications module 107, the activation of the continuity of a user's profile 102 (referred to in FIG. 1 as 1*b*);
- an application having certain privileges (which are out of the scope of the present invention) and being resident in the card 108, requests, through the card communication module 105, the activation of the continuity of a user's profile 102 (referred to in FIG. 1 as 1*c*).

Next, the profile manager 104 retrieves or copies the information of the user profile 102. In other words, it retrieves the profile itself 102. This is referred to as 2 in FIG. 1.

The profile manager 104 also retrieves the access policy (set of rules which govern the access to the user profile 102). This is referred to as 3 in FIG. 1.

Next, the profile manager 104 makes a request to the server 150, through its communications module 107, for starting a communication with the device 100 for retrieving the profile service 101 and storing it in the server 150 (including the relevant information gathered from the operating environment, as type of device, operative system, or connectivity capabilities, that may affect the profile service that it is being stored). This request, made by means of a migration request message, is done from the communications module 107 of the profile manager 104 of the device 100 to the communications module 152 of the profile migration module 151 of the server 150. This is represented by reference 4 in FIG. 1. When this request is accepted (reference 6 in FIG. 1), the profile manager 104 sends the server 150, using any conventional method (which is out of the scope of the present invention) to hide proprietary data from other elements not included in FIG. 1, the information of the user profile (that is to say, the user profile 102) and the access policy 103.

Obviously, the profile manager 104 does not need to be sent because it is already available in the server 150. Specifically, at the profile manager database 155, the profile manager 104 can be selected by the profile manager selector 156 using the information gathered by the profile migration module 151, such as the information of the different operating environments, type of device, operative system, or connectivity capabilities in step 10(*a, b c*) of FIG. 1.

As already mentioned, the server 150 comprises a profile continuity module or profile migration module 151 which in turn comprises a communications module 152 configured for interpreting the received messages. When the server 150 receives the message of request for retrieving and storing the profile 102 and the access policy 103, the profile migration module 151 stores the user profile 102 and the access policy 103 into the corresponding databases (access policy database 153 and profiles database 154). This is represented in FIG. 1 by reference 5.

The profile continuity module 151 assigns a unique identifier to the said profile migration request with the purpose of identifying it in the future.

This unique identifier is sent to the profile manager 104 of the device 100 through respective communications modules 152 107. This is referenced by 6 in FIG. 1. This unique identifier is totally independent from the user 110, which guarantees the user's privacy along the information exchange.

Finally, the profile manager 104 informs the entity (the graphical user interface 106 through which the user 110 can access the profile manager 104, the application 109 or the application which is resident in the card 108) which originated the request about the status of that request and about the unique identifier. This is referred to as 7*a*, 7*b*, 7*c* in FIG. 1. At this stage, it is possible that one or more of the elements providing the profile service 101 (that is to say, the profile manager 104, the profile or profiles 102 and the access policy 103) are uninstalled from the device 100, in order to avoid future possible inconsistencies due to the duplication of the profile in two different devices 100 120.

The second block for retrieving, from the server 150, the profile manager, profiles and access policy by the second device 120 is described next:

First, a request for retrieving, from the server 150 to the second device 120, the user profile 102, the access policy 103 and the profile manager 104 is made. This request includes the unique identifier previously assigned and information related to the operating environment in the device 120 from which the request is made. This request is preferably made from one of these situations/entities:

- a user 130 (preferably the same user 110 which requested the profile to be stored in the server 150) accesses the server 150 through a browser 127 of the device 120 and he/she introduces the unique identifier that was assigned to the said profile migration process. Then the browser 127 sends the request to the communications module 152 of the server 150 (referred to in FIG. 1 as 10*a*);
- an application 129 being resident in the device 120 communicates with the server 150 through an IP connection (referred to in FIG. 1 as 10*b*) including the unique identifier that was assigned to the said profile migration process;
- an application being resident in the card 128 communicates with the server 150 through an IP connection (referred to in FIG. 1 as 10*c*) including the unique identifier that was assigned to the said profile migration process.

The way the second device gets to know the unique identifier is out of the scope of the present invention, since the profile service is not responsible for remembering or notifying the identifier. On the contrary, it is up to the user, the application or the SIM card application. As a matter of example (which should not be considered as a limiting possibility): (1) The user can remember this identifier when he is using the first device and introduce it in the second one from a graphic application; (2) or the SIM card can store the identifier within its own memory space when it is used in the first device. When the user introduces the same SIM card in a second device, the identifier is retrieved from this space and used to recover the whole profile service; (3) or an application resident in the first device can store this identifier somewhere (maybe in a server). The same application can retrieve it from another device.

The profile continuity module or profile migration module 151 receives the request 10a 10b 10c and sends the profile manager selector 156 the information related to the type of terminal or device 120 from which the request is made. The profile manager selector 156 identifies which implementation of the profile manager is valid for that device 120 and sends back to the profile continuity module or profile migration module 151 a reference code of the valid profile manager (referred to in FIG. 1 as 11).

Next, the profile migration module 151 uses this reference code to obtain the valid profile manager implementation which is stored in the profile manager database 155. The profile migration module 151 also uses the unique identifier that was assigned to the profile migration process to obtain the user profile and the access policy, which are stored in the corresponding databases, access policy database 153 and profiles database 154, (all referred to in FIG. 1 as 12).

The profile continuity module or profile migration module 151 sends, to the device 120, the profile manager, the profile and the access policy (to the entity 127 128 129 which made the request) (referred to in FIG. 1 as 13a 13b 13c). The profile continuity module or profile migration module 151 then deletes any information it has associated to the identifier of the user profile and access policy, in order to guarantee the user's privacy.

Finally, the entity 127 128 129 through which the request was originated installs (respective steps 14a 14b 14c) the profile manager, the profile and the access policy in the second device 120 (referred to in FIG. 1 as 121).

In other words, once the appropriate profile manager(s) are operative in the operative system or firmware of the second device 120, then the profile or profiles are accessed either: by a procedure in one or several common entities among the communication device 120 of which the browser 127 is an example; or by other elements related to the device, as the Subscriber Identity Module or SIM 128 in mobile telephony systems, USB sticks or memory cards; or by a procedure initiated by the user service(s) 129; or by a procedure initiated by the user itself 130; or by an internal procedure in the profile manager (e.g. an integrity test or a data refresh).

This method provides the continuity to the profile service not only between devices but even over several profile managers because it guarantees the continuity of the profile and the profile manager.

Finally, there is a special advantage in having, at least partially, the profile manager locally in the second device 120, because it makes the profile services available even when connectivity is not available (i.e. offline).

Figure 2:
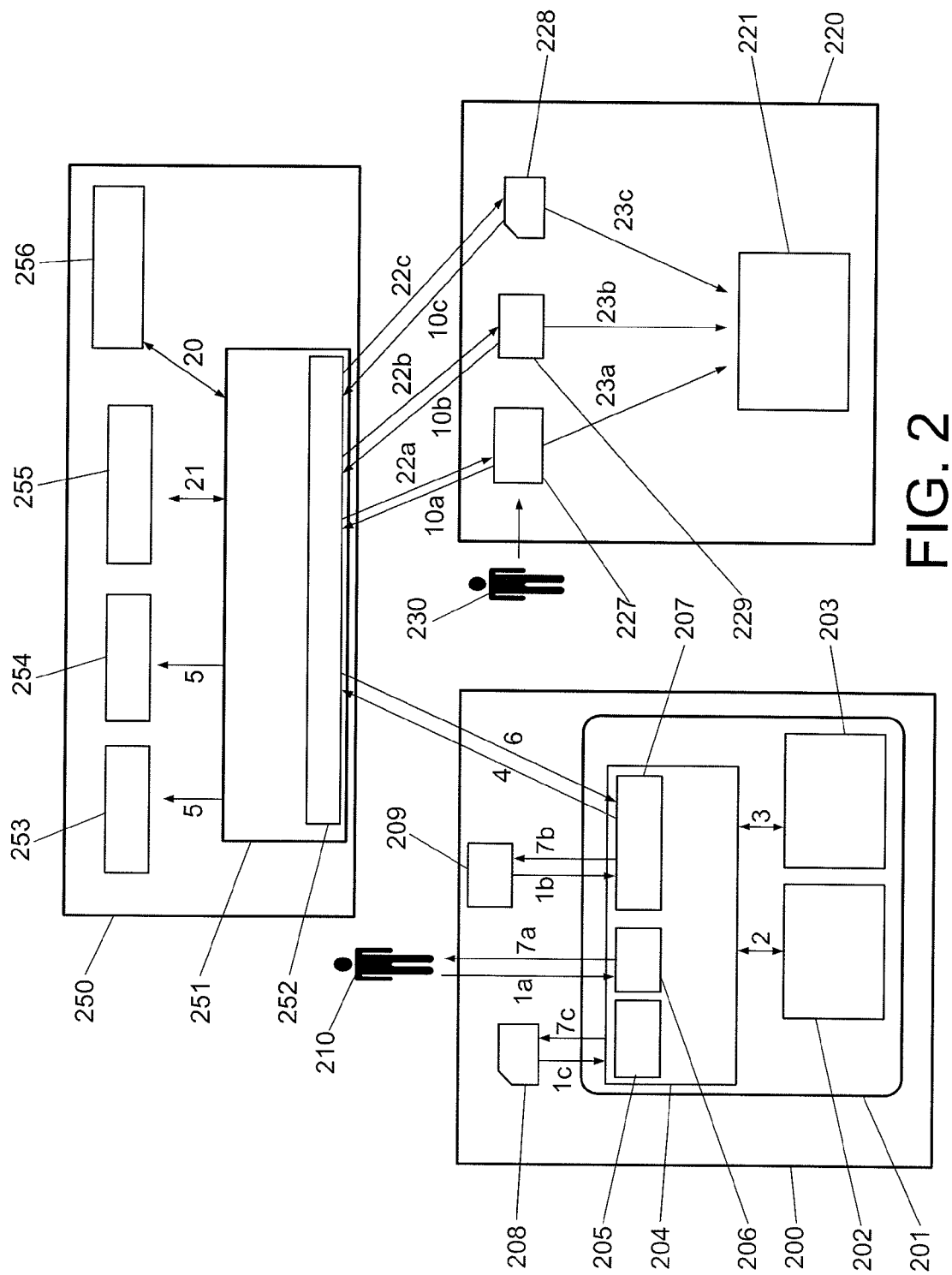
FIG. 2 shows a schematic representation of a system for implementing the method according to another embodiment of the present invention.

Next, a second exemplary embodiment of the present invention is described in relation to FIG. 2. This embodiment refers to a situation in which the second device 220, to which the profile service 201 of the first device 200 needs to be exported, does not possess all the required resources for installing the whole system (the whole profile service). As in the first embodiment, possible examples of the first device 200 and the second device 220 are: mobile phones, portable computers, video or audio reproducers, electronic book readers, game consoles, TV or multimedia sets, displays in cars or appliances, automatic transfer machines (ATMs), keyboards, electronic doors, alarms or security mechanisms, domotic equipment, etc. Preferably, the devices 200 220 are mobile communications devices.

In this second embodiment, the procedure up to step 10a 10b 10c is the same as that of the first embodiment (FIG. 1). In other words, the steps of transferring the profile service 201 of the first device 200 to the server 250 and those of storing the user profile 202 and the access policy 203 in databases 253 254 255 of the server 250 are the same. The profile manager 204 is also stored in a database 255 in the server 250. Also the request for retrieving, from the server 250 to the second device 220, the user profile 202, the access policy 203 and the profile manager 204 is similar to that of the first embodiment (steps 10a 10b 10c in FIG. 2).

The profile continuity module or profile migration module 251 receives the request 10a 10b 10c and sends the profile manager selector 256 the information related to the type of terminal or device 220 from which the request is made. However, in this embodiment, the profile manager selector 256 identifies that there exists no implementation of a complete profile manager that is valid for that device 220 based on existing (stored) rules in the profile manager selector 256 and on the information of the operating environment gathered by communications between the server 250 and the second device 220 (22a, 22b or 22c and 10a 10b or 10c of FIG. 2). As a consequence, it informs the profile migration module 251 about the fact that a reduced simple version of the profile manager can be installed in device 220. The simple versions or mini profile manager 221 consists in versions of the profile manager with a modified set of internal procedures that support the profile service using communications with the profile migration module 251 to circumvent the lack of capabilities needed by a hypothetical "non-Mini Profile" manager in the operating environment in device 220. For instance, a mini profile manager may be used in devices with no storage capabilities and therefore without possibility of having a local profile 202, being this circumstance solved by communications with the profile migration module 251 to query the profiles database 254. The profile migration module 251 is also told to keep the registers of profiles and access policies of the user in the access policy database 253 and in the profiles database 254 at the server 250 in order to perform remote connections in the event that any type of access to the profile is required. This exchange of information is referred to in FIGS. 2 as 22 and 10).

The profile migration module 251 thus obtains the simple valid profile manager from the identifier given by the profile manager selector 256, as described in the previous paragraph. The simple valid profile manager was stored in the profile manager database 255 (referred to in FIG. 1 as 21).

The profile continuity module or profile migration module 251 sends the device 220 the simple profile manager together with a unique reference which allows to identify the user in future access requests to the profile (to the entity 227 228 229 which made the request) (referred to in FIG. 2 as 23a 23b 23c). In this embodiment, the profile continuity module 251 does not delete the information about the profile and access policy stored in corresponding databases 254 153 of the server 250.

Finally, the entity 227 228 229 through which the request was originated installs (23a 23b 23c) the simple profile manager (referred to in FIG. 2 as 221) in the second device 220.

Figure 3:
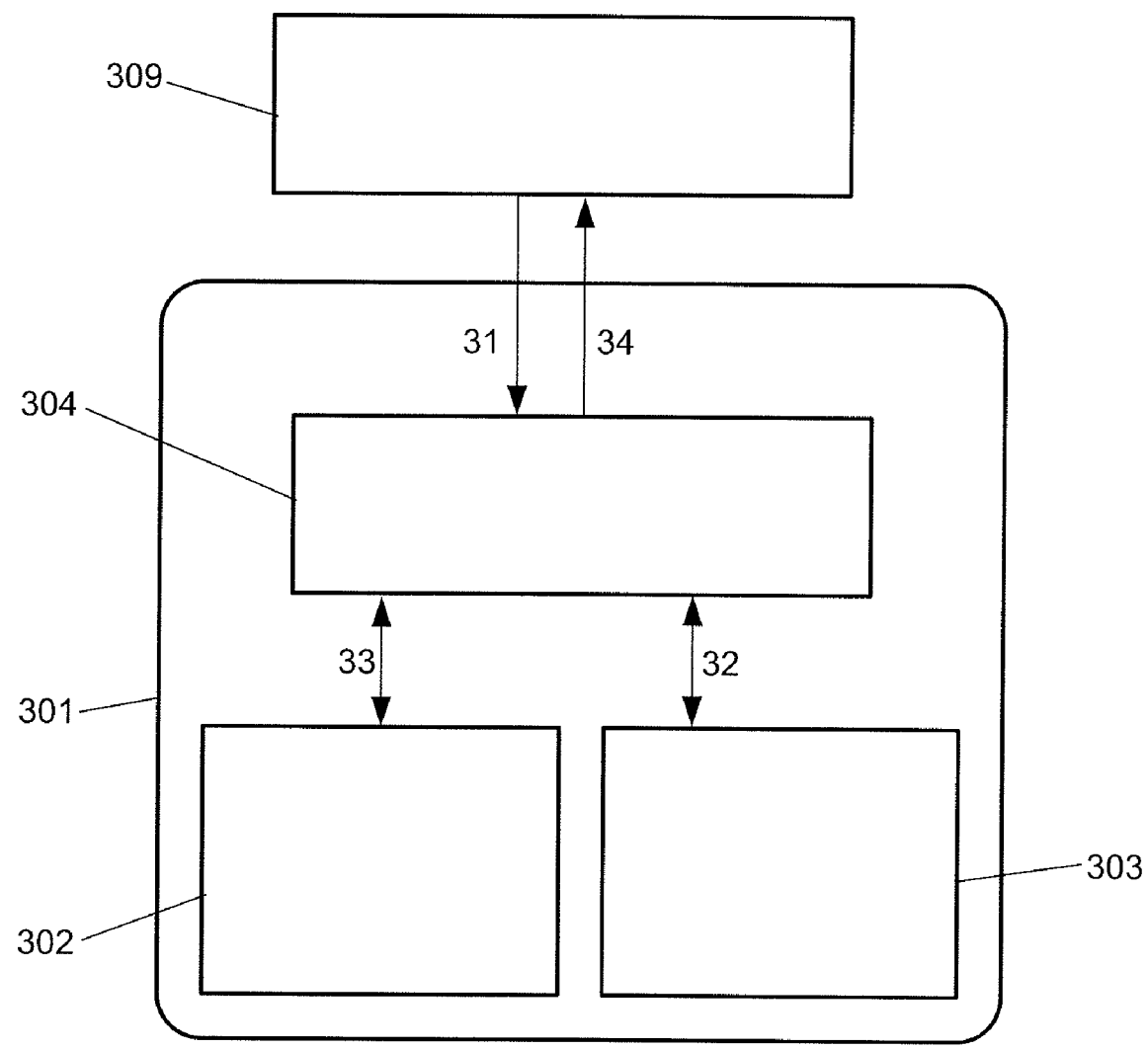
FIG. 3 shows a schematic representation of the local use of a profile service by an application.

Next, the local use of a profile service by an application is described in relation to FIG. 3.

An application 309, which can be either installed in the device which also holds the profile service 301 of a user or in a different device, tries to access (such as read, write, modify) a certain field of the user profile 302. In order to access such information, the application 309 sends a request to the profile manager 304 of the device (step 31).

The profile manager 304 comprises an applications identifier module (not illustrated in FIG. 3) that identifies which application 309 has requested access to the profile 302. The profile manager 304 can thus look up the rules for access to the profiles (access policy 303) that the user has provided that application 309 with (step 32).

If the application 309 has been given enough privileges for the type of access that has requested, the profile manager 304 performs that operation (the access to a certain field of the user profile 302) on the profile 302 (step 33).

Finally, the profile manager 304 informs the application 309 of the status of its request and, if the request is a request for reading a field of the profile 302, the profile manager 304 provides the application 309 with the required information.

Figure 4:
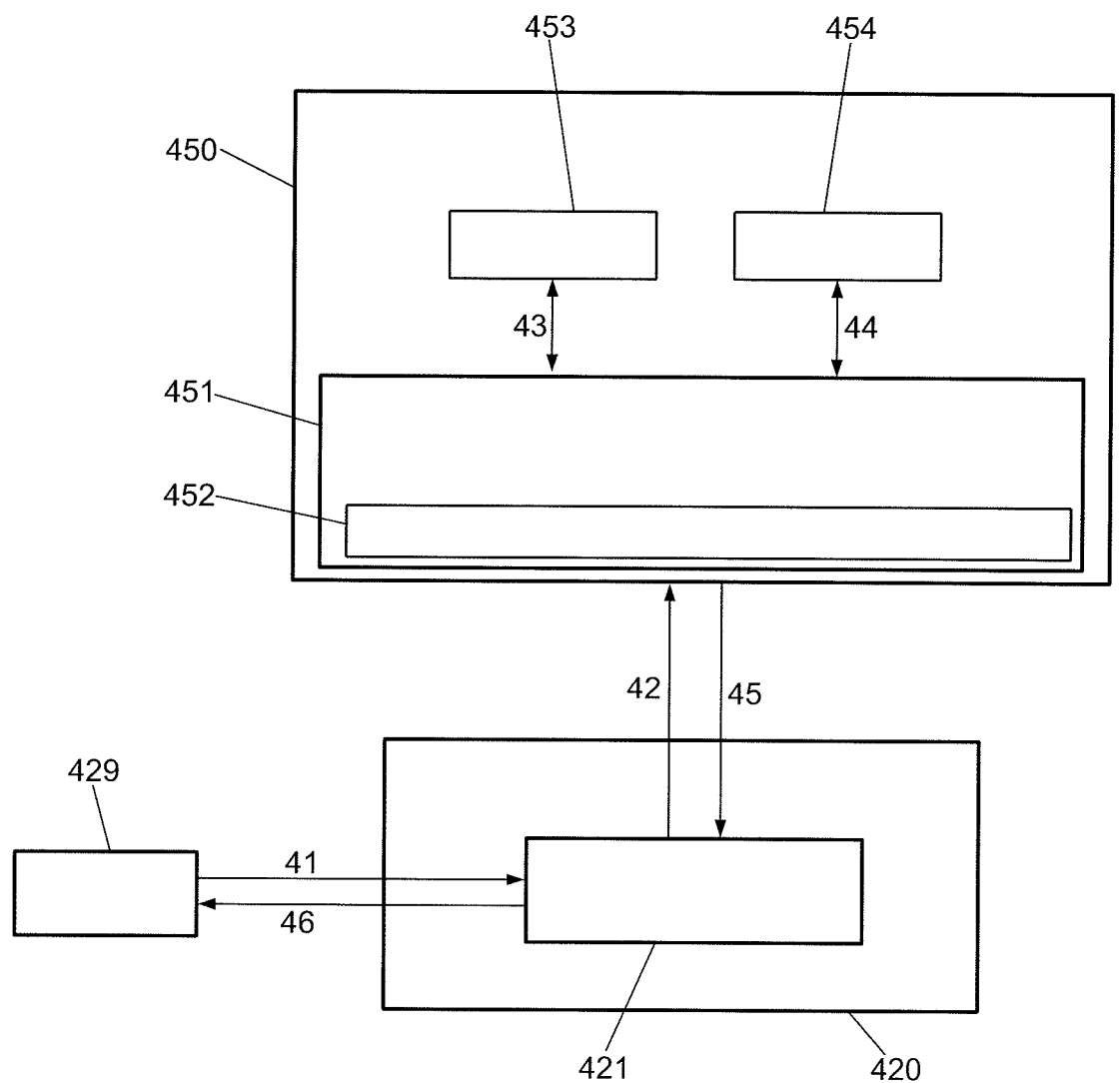
FIG. 4 shows a schematic representation of the remote use of a profile service by an application.

Next, the remote use of a profile service by an application is described in relation to FIG. 4.

When a device 420 does not have enough resources to deploy a complete implementation of a certain profile service (like the second device 220 of FIG. 2), a simpler version of the profile manager can be installed. This simpler version of the profile manager is capable of communicating with the server or continuity server (not illustrated in FIG. 4, but similar to the server 150 250 of respective FIGS. 1 and 2), which stores the whole profile service.

An application 429, which can be either installed in the device 420 which demands the profile service or in a different device, tries to access (such as read, write, modify) a certain field of the user profile. In order to access such information, the application 429 sends a request to the simple profile manager 421 (that is to say, the reduced version of the profile manager) of the device 420 (step 41).

The simple profile manager 421 comprises an applications identifier module (not illustrated in FIG. 4) that identifies which application 429 has requested access to the profile. The simple profile manager 421 can thus communicate with the server 450, which implements a generic profile manager as the one described in FIG. 1 by number 104, with full capabilities, within the profile continuity module or profile migration module 451 (step 42). This communication is preferably an IP communication to a communications module 452 of the profile continuity module 451 of the server 450. The user responsible for this request is identified by means of a unique identifier that the server 450 has previously sent to the simple profile manager 421 (explained in relation to FIG. 2).

The profile continuity module 451 of the server 450 can thus look up the rules for access to the profiles (access policy) that the user has provided that application 429 with (step 43).

If the application 429 has been given enough privileges for the type of access that has requested, the profile continuity module 451 performs that operation (the access to a certain field of the user profile) on the profile (step 44).

Then, the profile continuity module 451 informs the simpler profile manager 421 of the status of its request and, if the request is a request for reading a field of the profile, the profile continuity module 451 gives the simpler profile manager 421 the required information (step 45).

Finally, the simpler profile manager 421 informs the application 429 of the status of its request and, if the request is a request for reading a field of the profile, the simpler profile manager 421 gives the application 429 the required information (step 46).

In conclusion, the invention enables any device to access the profile of a user even if that device which requests said access is unable—for any reasons—to install or load a whole profile service of that profile.

The invention is not intended to be limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method of migrating a user profile from a first device to a second device, said method comprising:
    making a request for migrating a user profile located in the first device to the second device, said request being made to a profile manager located within said first device;
    retrieving by said profile manager information forming said user profile and an access policy to said user profile;
    sending, from said profile manager to a server, said information forming said user profile and said access policy, said server storing said information forming the user profile in a first database and said access policy in a second database, said server comprising a profile manager database wherein a plurality of profile managers are stored, including a copy of said profile manager located within said first device;
    making a request for sending from said server to the second device said user profile, said access policy and said profile manager respectively located in said first, second, and profile manager databases;
    sending from said server to said second device, at least a reduced version of said profile manager which is compatible with said second device.

2. The method of claim 1, wherein said step of sending said information forming said user profile and said access policy and storing said user profile and said access policy in the first and second databases respectively, comprises the steps of:
    sending a migration request message from a communications module of said profile manager to a communications module of a profile migration module located in said server;
    storing said information forming the user profile and said access policy in respective databases;
    assigning an identifier identifying said profile migration request;
    sending said identifier to the profile manager of said first device.

3. The method of claim 2, wherein said request for sending from said server to a second device said user profile, said access policy and said profile manager, comprises said identifier assigned to the migration request and information of a type of device from which said request is made.

4. The method of claim 3, wherein said identifier assigned to the migration request and said information of the type of device from which said request is made is obtained by interrogating by the profile migration module comprised in said server the entity of said second device initiating said request.

5. The method of claim 4, wherein said entity of said device initiating said request is selected from a group including:
    a graphical user interface through which a user is capable of accessing said second device;
    an application resident in said second device; and
    an application resident in a card located within said second device.

6. The method of claim 5, wherein said card in which said application is resident is a SIM card.

7. The method of claim 3, further comprising the steps of:
- receiving at the profile migration module located in said server said request comprising said identifier associated to the profile migration request and said information of the type of device from which said request is made;
- sending, from said profile migration module to a profile manager selector located in said server, said identifier and said information of the type of device;
- at said profile manager selector, identifying an implementation of the requested profile manager which is compatible with said type of device and sending a reference code of said profile manager to said profile migration module;
- obtaining from said profile manager database said identified implementation of the requested profile manager which is compatible with said type of device.

8. The method of claim 1, wherein said step of sending from said server to said second device, at least a reduced version of said profile manager which is compatible with said second device comprises sending from said server to said second device said requested user profile, access policy and profile manager.

9. The method of claim 1, wherein said step of making a request for migrating a user profile is made by:
- a user accessing said first device through a graphical user interface or by an application resident in said first device or by an application resident in a card located within said first device.

10. The method of claim 9, wherein said card in which said application is resident is a SIM card.

11. A system comprising a first device, a second device and a server, said system being configured for carrying out the method of claim 1.

12. The system of claim 11, wherein at least one of said first device or second device is a mobile communications device.

13. A non-transitory computer-usable storage medium having a program comprising computer readable instructions stored thereon that can be implemented to perform the steps of the method according to claim 1 when said program is run on a computer, a digital signal processor, a field-programmable gate array, an application-specific integrated circuit, a micro-processor, a micro-controller, or any other form of programmable hardware.

* * * * *